UNITED STATES PATENT OFFICE.

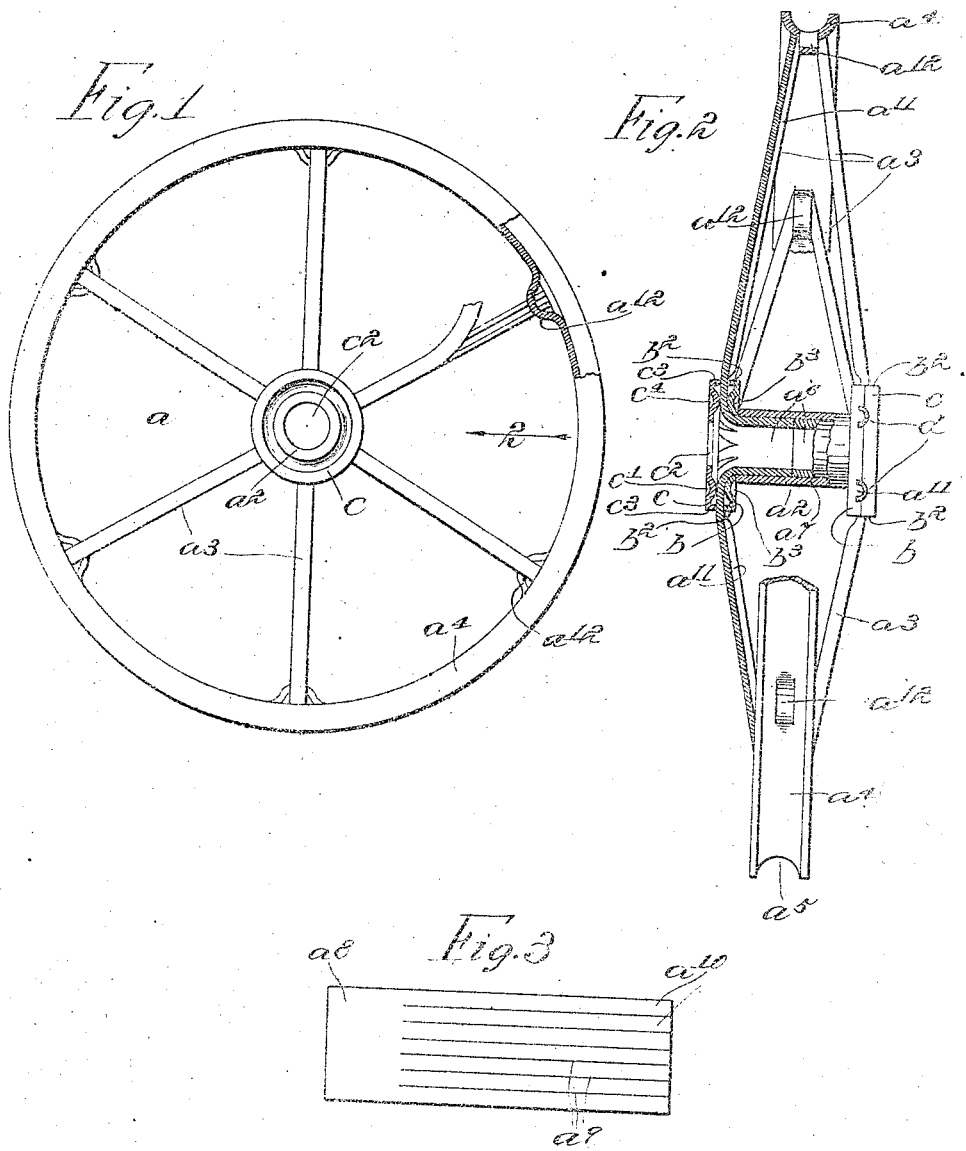

MAURICE LACHMAN, OF NEW YORK, N. Y., ASSIGNOR TO WELDED STEEL WHEEL COMPANY, OF NEW YORK, N. Y., A CORPORATION OF NEW YORK.

WHEEL.

948,998.  Specification of Letters Patent.  Patented Feb. 15, 1910.

Application filed April 30, 1909. Serial No. 493,107.

*To all whom it may concern:*

Be it known that I, MAURICE LACHMAN, a citizen of the United States, and residing at New York, in the county of New York and State of New York, have invented certain new and useful Improvements in Wheels, of which the following is a specification, such as will enable those skilled in the art to which it appertains to make and use the same.

This invention relates to vehicle wheels, and particularly to wheels designed for use on what is known as go-carts, perambulators and other light vehicles; and the object thereof is to provide a wheel of this class which is composed entirely of metal and which will be strong and durable and with this and other objects in view the invention consists in a wheel constructed as hereinafter described and claimed.

The invention is fully disclosed in the following specification, of which the following drawing forms a part, in which the separate parts of my improvement are designated by suitable reference characters in each of the views, and in which:—

Figure 1 is a side view of the wheel made according to my invention, part of the construction being broken away. Fig. 2 a sectional view thereof looking in the direction of the arrow 2 of Fig. 1, and Fig. 3 a view showing a blank employed in forming the hub and spokes of the wheel.

In the practice of my invention I provide a wheel $a$ composed of a hub $a^2$, spokes $a^3$, and a rim $a^4$. The rim $a^4$ is stamped from sheet metal and preferably provided with a groove $a^5$ adapted to receive an ordinary elastic tire.

The body of the hub $a^2$ is composed of two similar tubular inner members $a^6$ inclosed by sleeve $a^7$, and the inner members $a^6$ of the hub are formed from blanks $a^8$ shown in Fig. 3, two of said blanks being employed in forming the said inner member of the hub and spokes $a^3$. In this operation of forming the inner part of the hub the blanks $a^8$ are slitted longitudinally at one end as shown at $a^9$ and the parts $a^{10}$ thus formed are bent to form the spokes $a^3$, which are stamped to form longitudinal grooves $a^{11}$ in the inner sides thereof which give additional strength thereto. After the blanks $a^8$ have been slitted longitudinally to form the parts $a^{10}$ the said blanks are folded longitudinally into tubular forms and washers or disks $b$ are slipped on over the end portions thereof onto the central tubular portions thereof, and the tubular end portions thereof are connected by the sleeve $a^7$ which is pressed thereon and welded thereto after which the spokes forming members $a^{10}$ are bent to form the spokes $a^3$, said spokes forming members having been first grooved longitudinally as hereinbefore described.

Instead of following the above described process of assembling the parts $a^6$, $a^7$ and $b$ the spokes forming members $a^{10}$ of the blanks $a^8$ may be first grooved and one of the disks or washers $b$ may be placed in position on one of the hub members $a^6$, the sleeve $a^7$ may then be placed on said part of the hub, and the other part $a^6$ of the hub inserted into said sleeve, after the corresponding disk or washer $b$ has been placed thereon, and said sleeve and disks or washers may be welded together and to central hub members $a^6$.

The rim $a^4$ is provided at predetermined intervals with inwardly directed lugs $a^{12}$ which are stamped from the material of said rim as is clearly indicated in the drawing; and in the process of forming the wheel the spokes $a^3$ are bent into the position shown in Fig. 2 and the ends thereof are welded to said lugs $a^{12}$.

The outer hub disks or washers $c$ are also employed, and these disks or washers are similar to the corresponding inner disks or washers $b$, and the disks or washers $c$ are provided with openings $c^2$ which correspond with the opening through the hub and through which the spindle or axle of the wheel passes, said spindle or axle being not shown.

The disks or washers $b$ are provided at their perimeter with inwardly directed flanges $b^2$ and the disks or washers $c$ with inwardly directed flanges $c^3$ and these flanges are provided at their adjacent edges with recesses $d$ through which the inner ends of the spokes $a^3$ pass and at this point said spokes $a^3$ are flat or are not grooved longitudinally, as they are between the rim $a^4$ and the said disks or washers $b$ and $c$, which form the end portions of the hub $a^2$. The disks or washers $b$ are also provided in their outer faces with an annular groove $b^3$, and the disks or washers $c$ are provided in their outer faces with an annular groove $c^4$ and these grooves form corresponding annular beads on the inner faces of said disks or washers, and these beads press upon and securely hold the spokes $a^3$ adjacent to the hub $a^2$. The grooves $b^3$ and $c^4$ are formed by a suitable die or press device, and in practice the said disks or washers are pressed firmly together and are welded together and to the spokes $a^3$; and this construction, as will be seen, forms a substantial and strong wheel, and one the separate parts of which will not work loose or become disconnected, and by means of my improvement I provide a wheel of the class specified which possesses a maximum of strength with a minimum of weight; and various changes and modifications of the construction herein described may be made, within the scope of the appended claims, without departing from the spirit of my invention or sacrificing its advantages.

Having fully described my invention what I claim as new and desire to secure by Letters Patent, is:—

1. A metal wheel composed of a hub, a rim, and spokes connecting said hub and rim, said hub being composed of two tubular members on which is placed a sleeve by which said members are connected, said tubular members being provided at their outer ends with integral spokes the outer ends of which are secured to the rim, the inner ends of said spokes being inclosed by annular disks or washers which are secured thereto and to each other and to the hub members.

2. In a wheel, a hub formed from two blanks folded longitudinally into tubular form and inclosed by a sleeve secured thereto the outer end portions of said blanks being slit longitudinally to form the spokes of the wheel, and the inner portions of said spokes adjacent to said hub being inclosed by annular disks or washers which are secured thereto and to said hub.

3. In a wheel, a hub formed from two blanks folded longitudinally into tubular form and inclosed by a sleeve secured thereto the outer end portions of said blanks being slit longitudinally to form the spokes of the wheel, and the inner portions of said spokes adjacent to said hub being inclosed by annular disks or washers which are secured thereto and to said hub, and the outer end portions of the spokes being secured to the rim by welding and all the other parts of the wheel being welded together.

In testimony that I claim the foregoing as my invention I have signed my name in presence of the subscribing witnesses this 27th day of April 1909.

MAURICE LACHMAN.

Witnesses:
REGINALD HAWLEY,
J. W. CORRIGAN.